United States Patent
Doi et al.

(10) Patent No.: US 10,054,744 B2
(45) Date of Patent: Aug. 21, 2018

(54) OPTICAL MODULE AND OPTICAL FIBER ASSEMBLY

(71) Applicant: Fujitsu Optical Components Limited, Kawasaki-shi, Kanagawa (JP)

(72) Inventors: Masaharu Doi, Sapporo (JP); Akira Ishii, Yokohama (JP); Teruhiro Kubo, Kitahiroshima (JP); Yoshinobu Kubota, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/067,949

(22) Filed: Mar. 11, 2016

(65) Prior Publication Data

US 2016/0313510 A1    Oct. 27, 2016

(30) Foreign Application Priority Data

Apr. 22, 2015 (JP) ................................. 2015-087887

(51) Int. Cl.
*G02B 6/32* (2006.01)
*G02B 6/30* (2006.01)
*G02B 6/34* (2006.01)
*G02F 1/225* (2006.01)

(52) U.S. Cl.
CPC ............... *G02B 6/30* (2013.01); *G02B 6/34* (2013.01); *G02F 1/225* (2013.01); *G02B 6/32* (2013.01); *G02F 2203/02* (2013.01)

(58) Field of Classification Search
USPC .......................................................... 385/31
See application file for complete search history.

(56) References Cited

U.S. PATENT DOCUMENTS

| | | | |
|---|---|---|---|
| 5,390,271 A * | 2/1995 | Priest ................... | G02B 6/4204 385/31 |
| 7,251,076 B1 * | 7/2007 | Okada ...................... | G02B 5/00 359/489.09 |
| 7,394,841 B1 * | 7/2008 | Konttinen ............. | G02F 1/3501 372/21 |
| 2004/0223690 A1 | 11/2004 | Saitou | |

(Continued)

FOREIGN PATENT DOCUMENTS

| JP | 63-168632 A | 7/1988 |
|---|---|---|
| JP | 4-277701 A | 12/1992 |

(Continued)

OTHER PUBLICATIONS

Japanese Office Action dated May 9, 2017 from Japanese Patent Application No. 2015-087887.

*Primary Examiner* — Eric Wong
(74) *Attorney, Agent, or Firm* — Staas & Halsey LLP (57) ABSTRACT

An optical module includes a substrate on which an optical waveguide is formed, and an optical fiber assembly. The optical fiber assembly includes an optical fiber, a translucent member, and a mirror portion. The translucent member includes a joint surface joined to an end surface of the substrate at an end of the optical waveguide, and is attached to a distal end of the optical fiber. The mirror portion is formed on the translucent member, reflects light emitted from the distal end of the optical fiber in a direction different from a traveling direction of the light, and collects the reflected light into the end of the optical waveguide through the joint surface.

18 Claims, 6 Drawing Sheets

(56) References Cited

U.S. PATENT DOCUMENTS

2011/0299811 A1* 12/2011 O'Brien .................. G02B 6/32
                                                            385/26
2012/0328236 A1   12/2012 Nasu et al.
2013/0207140 A1*  8/2013 Makino ................. H01L 33/58
                                                            257/94

FOREIGN PATENT DOCUMENTS

| JP | 2003-241008 A | 8/2003 |
| JP | 2004-125854   | 4/2004 |
| JP | 2004-271681 A | 9/2004 |
| JP | 2008-015224 A | 1/2008 |
| JP | 2013-007797 A | 1/2013 |

* cited by examiner

OPTICAL MODULE AND OPTICAL FIBER ASSEMBLY

CROSS-REFERENCE TO RELATED APPLICATION

This application is based upon and claims the benefit of priority of the prior Japanese Patent Application No. 2015-087887, filed on Apr. 22, 2015, the entire contents of which are incorporated herein by reference.

FIELD

The embodiment discussed herein is related to an optical module and an optical fiber assembly.

BACKGROUND

A Mach-Zehnder modulator (hereinafter referred to as an "LN modulator") produced using lithium niobate ($LiNbO_3$) or the like is known as a modulator for an optical transmission system. The LN modulator has been widely used for a high-speed optical transmission system at 10 GHz or more owing to its excellent high-speed characteristics and chirp characteristics. Since not only the LN modulator but also other components are mounted on an optical transceiver equipped with the LN modulator, it is preferable to miniaturize the LN modulator in order to realize high-density mounting.

In the LN modulator, for example, an optical waveguide formed on a substrate and an input/output optical fiber coupled to the optical waveguide are arranged so as to extend in the same direction. Therefore, a space for arranging the optical fiber along the extending direction of the optical waveguide is created. Accordingly, the size of the LN modulator is increased along the extending direction of the optical waveguide.

In order to suppress such an increase in the size of the LN modulator, another LN modulator has been proposed in which an optical waveguide and an optical fiber are arranged so as to extend in different directions. In this LN modulator, an end surface of a substrate at an end of the optical waveguide is formed into an inclined surface, and light emitted from the optical fiber arranged along a direction crossing the optical waveguide is reflected by the inclined surface of the substrate and enters the optical waveguide.

Japanese Laid-open Patent Publication No. 2004-125854

Although a device is expected to be miniaturized by using a conventional structure in which light emitted from an optical fiber is reflected by an inclined surface of a substrate and enters an optical waveguide, there has been a problem that the optical waveguide and the optical fiber extending in different directions are not easily coupled to each other.

Specifically, in the conventional structure, since the light emitted from the optical fiber is reflected by the inclined surface of the substrate, work for adjusting a positional relation between the inclined surface of the substrate and the optical fiber is complicated. In the conventional structure, therefore, the optical waveguide and the optical fiber extending in the different directions are not easily coupled to each other.

In order to address this problem and omit the above-mentioned position adjustment of the optical fiber with respect to the inclined surface of the substrate, another LN modulator has been developed in which an inclined surface is not formed on a substrate, and light emitted from an optical fiber is reflected by a reflection member and enters an optical waveguide. In such an LN modulator, since the reflection member is arranged at a position apart from the substrate, an optical path from a distal end of the optical fiber to the optical waveguide is longer than that of a structure in which an end surface of a substrate at an end of an optical waveguide is formed into an inclined surface. In this case, a loss of light occurs due to the long optical path from the distal end of the optical fiber to the optical waveguide. A possible way to suppress the loss of light is to employ such a structure that a condenser lens such as a collimate lens is arranged between the reflection member and the optical waveguide. In this structure, light reflected by the reflection member enters the condenser lens, and is collected by the condenser lens into the end of the optical waveguide.

In the structure in which the condenser lens is arranged between the reflection member and the optical waveguide, however, a space for arranging the condenser lens as well as the reflection member is created. As a result, miniaturization of the device is inhibited.

SUMMARY

According to an aspect of an embodiment, an optical module includes a substrate on which an optical waveguide is formed; and an optical fiber assembly including: an optical fiber; a translucent member including a joint surface joined to an end surface of the substrate at an end of the optical waveguide, the translucent member being attached to a distal end of the optical fiber; and a mirror portion that reflects light emitted from the distal end of the optical fiber in a direction different from a traveling direction of the light, and collects the reflected light into the end of the optical waveguide through the joint surface, the mirror portion being formed on the translucent member The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiment of the present invention will be explained with reference to accompanying drawings. The optical module and the optical fiber assembly disclosed in the present application are not limited by the following example.

Figure 1:
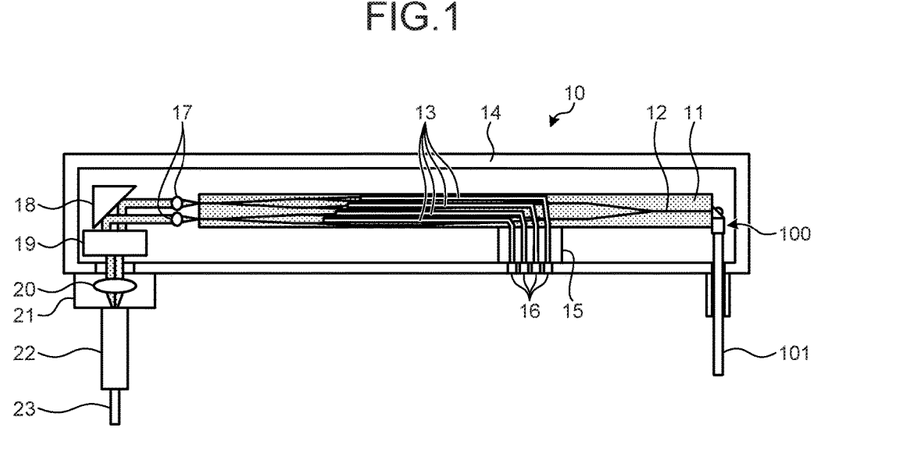
FIG. 1 is a top view illustrating a configuration of an optical module according to the present example.

First, a configuration of an optical module according to an example disclosed in the present application will be described. FIG. 1 is a top view illustrating the configuration of the optical module according to the present example. As illustrated in FIG. 1, an optical module 10 is formed in such a manner that an electrode 13 is provided in the vicinity of an optical waveguide 12 formed on a substrate 11. The substrate 11 is formed of LiNbO$_3$, and also referred to as an LN substrate. The optical waveguide 12 is formed in such a manner that a metal film made of, for example, Ti is formed and subjected to thermal diffusion, or patterned and subjected to a proton exchange in benzoic acid. The optical waveguide 12 forms a Mach-Zehnder interferometer, and the electrode 13 is provided on a Mach-Zehnder parallel waveguide.

Since a change in a refractive index due to an electric field in a z-axis direction is utilized in the electrode 13, the electrode 13 is arranged immediately above the optical waveguide 12. The electrode 13 is, for example, a coplanar electrode formed in such a manner that a signal electrode and ground electrodes are patterned on the optical waveguide 12. The optical module 10 includes a buffer layer between the substrate 11 and the electrode 13 in order to prevent light propagated through the optical waveguide 12 from being absorbed by the above-mentioned signal electrode and ground electrode. The buffer layer is formed of, for example, SiO$_2$ or the like.

In the optical module 10, a connector 16 is provided on a package 14 via a relay substrate 15. Components such as the substrate 11 are housed in the package 14. The connector 16 causes an electrical signal for modulating the light propagated through the optical waveguide 12 to be input to the electrode 13.

As illustrated in FIG. 1, the optical module 10 includes an optical fiber assembly 100 arranged at a former-stage side of the substrate 11. The optical fiber assembly 100 couples an optical fiber 101 to the optical waveguide 12 on the substrate 11. The optical fiber 101 receives input of light from a light source. A configuration of the optical fiber assembly 100 will be described later.

In the optical module 10, as illustrated in FIG. 1, a collimate lens 17, a reflection member 18, a polarization beam combiner 19, a condenser lens 20, a lens holder 21, a ferrule 22, and an optical fiber 23 are arranged at a latter-stage side of the substrate 11. The collimate lens 17 collimates a plurality of output light beams output from the optical waveguide 12 on the substrate 11.

The reflection member 18 reflects the plurality of output light beams collimated by the collimate lens 17 in a direction different from a traveling direction of the plurality of output light beams. For example, the reflection member 18 reflects the plurality of output light beams in a direction crossing an extending direction of the optical waveguide 12.

The polarization beam combiner 19 rotates one of the plurality of output light beams reflected by the reflection member 18 and combines the plurality of output light beams reflected by the reflection member 18.

The condenser lens 20 collects, into the optical fiber 23, polarization multiplexed light obtained by the polarization beam combiner 19. The lens holder 21 fixes the condenser lens 20 to the package 14. The ferrule 22 fixes the optical fiber 23 to the lens holder 21.

The optical fiber 23 transmits the polarization multiplexed light collected by the condenser lens 20 to a device arranged at a latter-stage side.

In the optical module 10, light from a light source is input to the optical fiber assembly 100. The light input to the optical fiber assembly 100 is input to the optical waveguide 12 forming the Mach-Zehnder interferometer. Meanwhile, in the optical module 10, the electrical signal such as an RF signal is input from an input side to the connector 16. The electrical signal input to the connector 16 is propagated through the relay substrate 15 and input to the electrode 13. At this time, a refractive index of a pair of the optical waveguides 12 forming the Mach-Zehnder interferometer is changed by the electric field. Accordingly, a phase difference between the optical waveguides 12 is changed. As a result, a plurality of light beams subjected to phase modulation due to Mach-Zehnder interference is output as the output light beams from the optical waveguide 12. The plurality of output light beams output from the optical waveguide 12 is input to the polarization combiner 19 through the collimate lens 17 and the reflection member 18, and polarization multiplexed and combined by the polarization beam combiner 19. The polarization multiplexed light obtained by the polarization combiner 19 is collected by the condenser lens 20 into the optical fiber 23.

Figure 2:
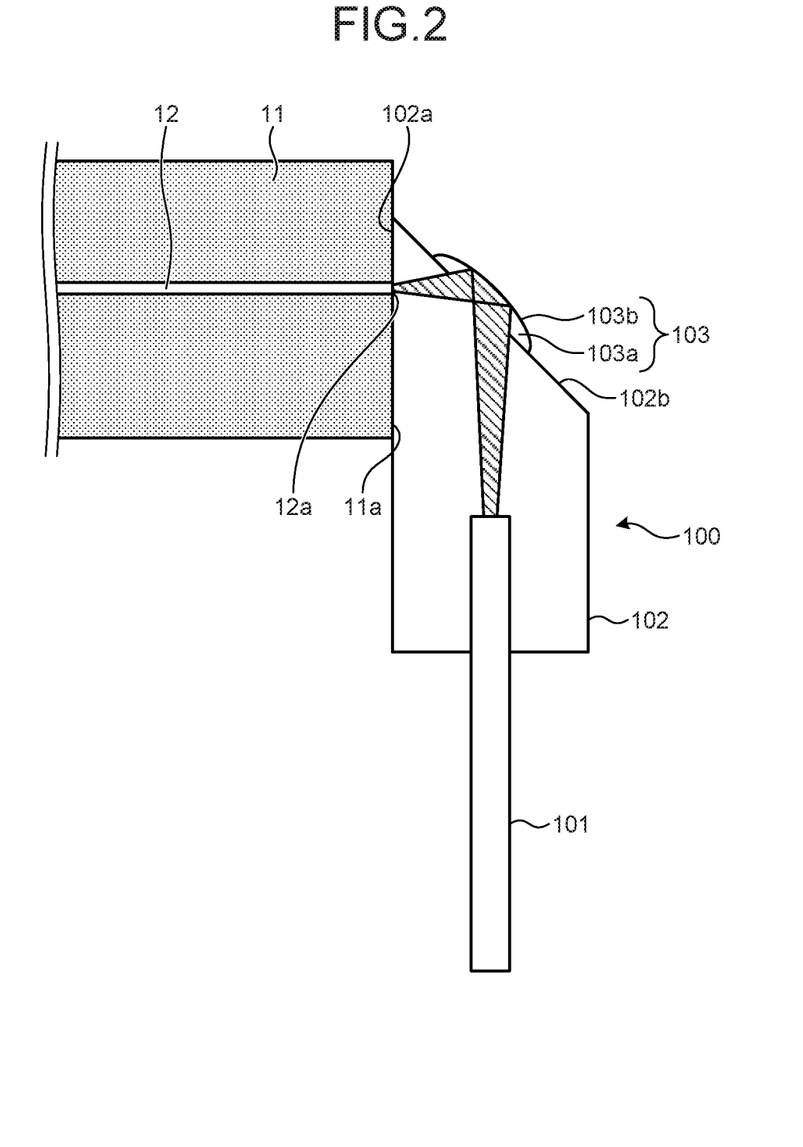
FIG. 2 is an enlarged top view illustrating an exemplary connection between an optical fiber assembly and an optical waveguide according to the present example.

Next, the configuration of the optical fiber assembly 100 illustrated in FIG. 1 will be described with reference to FIG. 2. FIG. 2 is an enlarged top view illustrating an exemplary connection between the optical fiber assembly and the optical waveguide according to the present example.

As illustrated in FIG. 2, the optical fiber assembly 100 includes the optical fiber 101, a ferrule 102, and a mirror portion 103.

The optical fiber 101 is arranged along a direction crossing an extending direction of the optical waveguide 12 on the substrate 11. For example, the optical fiber 101 is arranged along a direction orthogonal to the extending direction of the optical waveguide 12 on the substrate 11. The optical fiber 101 receives input of light from a light source (not illustrated), and emits the light from a distal end of the optical fiber 101.

The ferrule 102 is attached to the distal end of the optical fiber 101. The ferrule 102 is formed of a translucent material, and transmits the light emitted from the distal end of the optical fiber 101. The ferrule 102 includes a joint surface 102a joined to an end surface 11a of the substrate 11 at an end 12a of the optical waveguide 12. The ferrule 102 includes an inclined surface 102b inclined relative to a traveling direction of the light emitted from the distal end of the optical fiber 101. This ferrule 102 corresponds to an example of a translucent member.

The mirror portion 103 is formed on the ferrule 102, reflects the light emitted from the distal end of the optical fiber 101 in a direction toward the end 12a of the optical waveguide 12, and collects the reflected light into the end 12a of the optical waveguide 12 through the joint surface 102a. Specifically, the mirror portion 103 includes a projection 103a and a curved surface 103b. The projection 103a is formed on the inclined surface 102b of the ferrule 102, and formed of the same translucent material as the ferrule 102. The curved surface 103b is formed on the projection 103a. By using total reflection at the curved surface 103b, the mirror portion 103 reflects the light emitted from the distal end of the optical fiber 101 in the direction toward the end 12a of the optical waveguide 12, and collects the reflected light into the end 12a of the optical waveguide 12 through the joint surface 102a.

In addition, the mirror portion 103 collects the reflected light into the end 12a of the optical waveguide 12 through the joint surface 102a such that a diameter of the reflected light approximates or matches a mode field diameter of the optical waveguide 12 at the joint surface 102a. Specifically, the curved surface 103b of the mirror portion 103 has such a curvature as to allow the reflected light to be collected into the end 12a of the optical waveguide 12 through the joint surface 102a such that the reflected light approximates or matches the mode field diameter of the optical waveguide 12 at the joint surface 102a.

Figure 3:
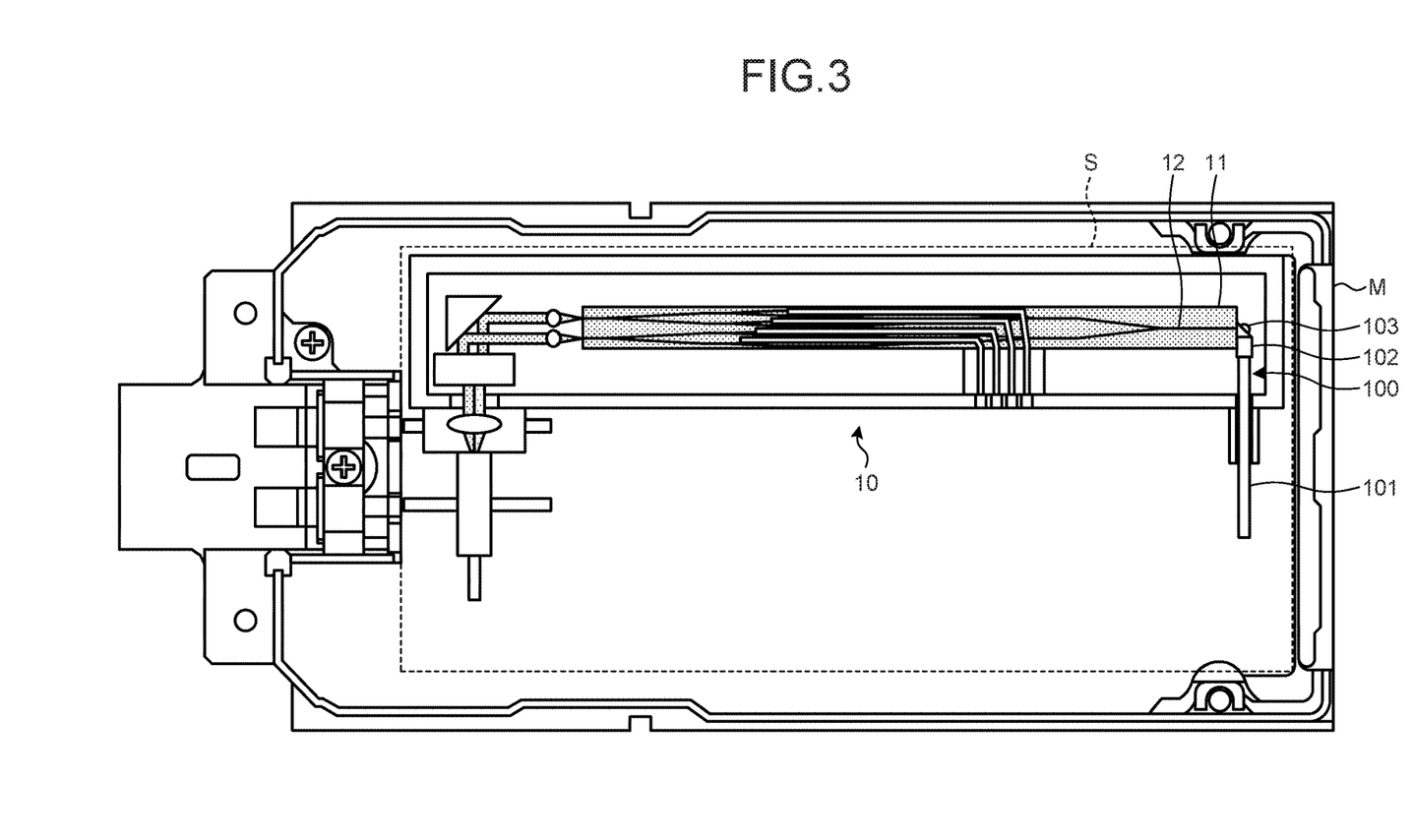
FIG. 3 is an explanatory view for explaining how the optical module is housed in an optical transceiver according to the present example.

Next, how the optical module 10 is housed in an optical transceiver M will be described with reference to FIG. 3. FIG. 3 is an explanatory view for explaining how the optical module is housed in the optical transceiver according to the present example.

In the optical module 10 illustrated in FIG. 3, the optical fiber assembly 100 reflects the light emitted from the distal end of the optical fiber 101 in the direction toward the end 12a of the optical waveguide 12, and collects the reflected light into the end 12a of the optical waveguide 12 through the joint surface 102a of the ferrule 102. Meanwhile, in a conventional optical module, light emitted from a distal end of an optical fiber 101 is reflected by a reflection member such as a mirror, and the reflected light is collected by a condenser lens such as a collimate lens into an end 12a of an optical waveguide 12. In the conventional optical module, therefore, a space for arranging the reflection member and the condenser lens along the extending direction of the optical waveguide 12 is created between the optical fiber 101 and the optical waveguide 12, and the size of the optical module might be increased due to such a space. As a result, the optical module might not be housed in an internal space S of an optical transceiver M.

In the optical module 10 according to the present example, on the other hand, the optical fiber assembly 100 reflects the light from the distal end of the optical fiber 101 in the direction toward the end 12a of the optical waveguide 12, and collects the reflected light into the end 12a of the optical waveguide 12 through the joint surface 102a of the ferrule 102. Consequently, the space for arranging the reflection member and the condenser lens along the extending direction of the optical waveguide 12 is reduced, and the increase in the size of the optical module 10 along the extending direction of the optical waveguide 12 is avoided. As a result, the optical module 10 is housed in an internal space S of the optical transceiver M as illustrated in FIG. 3.

As mentioned above, in the optical module 10, the optical fiber assembly 100 reflects the light from the distal end of the optical fiber 101 in the direction toward the end 12a of the optical waveguide 12, and collects the reflected light into the end 12a of the optical waveguide 12 through the joint surface 102a of the ferrule 102. Therefore, the increase in the size of the optical module 10 along the extending direction of the optical waveguide 12 is avoided. Furthermore, a user of the optical module 10 can adjust a positional relation between the optical waveguide 12 and the optical fiber 101 extending in different directions while the joint surface 102a of the ferrule 102 is joined to the end surface 11a of the substrate 11. As a result, the optical waveguide 12 and the optical fiber 101 extending in the different directions can be easily coupled to each other, and a device can be miniaturized.

In addition, in the optical module 10, the mirror portion 103 collects the reflected light into the end 12a of the optical waveguide 12 through the joint surface 102a such that the reflected light approximates or matches the mode field diameter of the optical waveguide 12 at the joint surface 102a of the ferrule 102. Consequently, leakage of the light that enters the optical waveguide 12 is suppressed. As a result, the optical waveguide 12 and the optical fiber 101 extending in the different directions can be easily coupled to each other with a loss of the light at the optical waveguide 12 suppressed.

First Variation

Next, a first variation will be described. An optical module according to the first variation has the same configuration as the optical module 10 according to the above-mentioned example except that the ferrule 102 is separably formed. In the first variation, therefore, components which are common to the above-mentioned example are denoted by the same reference signs, and detailed explanations of these components are omitted.

Figure 4:
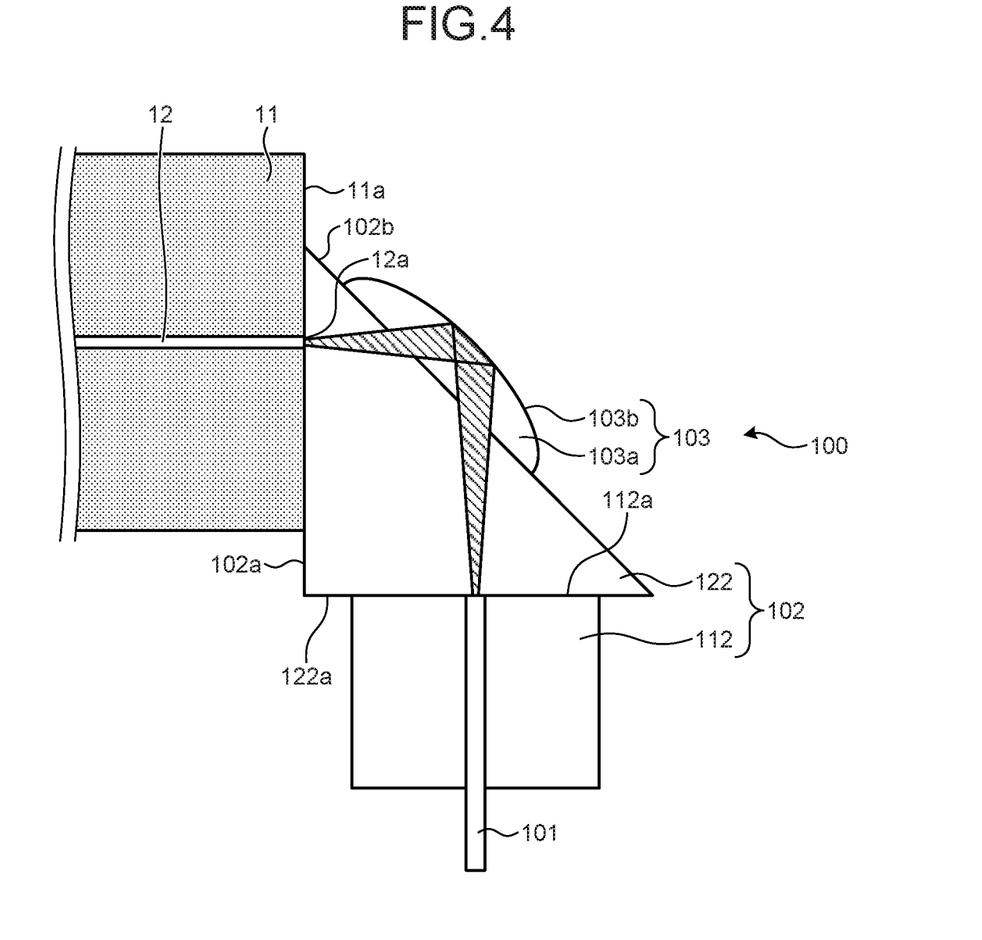
FIG. 4 is an enlarged top view illustrating an exemplary connection between an optical fiber assembly and an optical waveguide according to a first variation.

FIG. 4 is an enlarged top view illustrating an exemplary connection between the optical fiber assembly and the optical waveguide according to the first variation. In the optical fiber assembly 100 illustrated in FIG. 4, the ferrule 102 is formed so as to be separable into a first ferrule 112 attached to the distal end of the optical fiber 101 and a second ferrule 122 including the joint surface 102a, with the mirror portion 103 formed on the second ferrule 122. A separation surface 112a of the first ferrule 112 and a separation surface 122a of the second ferrule 122 are slidably in contact with each other. By sliding the separation surface 112a of the first ferrule 112 against the separation surface 122a of the second ferrule 122, a position of the first ferrule 112 with respect to a position of the second ferrule 122 is adjusted. The first ferrule 112 and the second ferrule 122 respectively correspond to an example of a first translucent member and an example of a second translucent member.

While the separation surface 112a is in contact with the separation surface 122a, and when the position of the first ferrule 112 with respect to the position of the second ferrule 122 is adjusted to a predetermined position, the mirror portion 103 collects the reflected light into the end 12a of the optical waveguide 12 through the joint surface 102a. In this regard, the predetermined position is, for example, such a position as to allow the mirror portion 103 to reflect the light emitted from the distal end of the optical fiber 101 in the direction toward the end 12a of the optical waveguide 12.

As mentioned above, in the optical module 10 according to the first variation, the ferrule 102 is formed so as to be separable into the first ferrule 112 attached to the distal end of the optical fiber 101 and the second ferrule 122 including the joint surface 102a, with the mirror portion 103 formed on the second ferrule 122. While the separation surface 112a is in contact with the separation surface 122a, and when the position of the first ferrule 112 with respect to the position of the second ferrule 122 is adjusted to the predetermined position, the mirror portion 103 collects the reflected light into the end 12a of the optical waveguide 12 through the joint surface 102a. Therefore, even if a positional relation between a light collecting position on the joint surface 102a and the end 12a of the optical waveguide 12 is deviated due to an error in manufacturing the ferrule 102, the light collecting position on the joint surface 102a can be made to coincide with the position of the end 12a of the optical waveguide 12. As a result, the optical waveguide 12 and the optical fiber 101 extending in the different directions can be easily coupled to each other with the loss of the light at the optical waveguide 12 suppressed.

Second Variation

Next, a second variation will be described. An optical module according to the second variation has the same configuration as the optical module 10 according to the above-mentioned first variation except that the separation surface of the ferrule 102 or the like is inclined. In the second variation, therefore, components which are common to the above-mentioned first variation are denoted by the same reference signs, and detailed explanations of these components are omitted.

Figure 5:
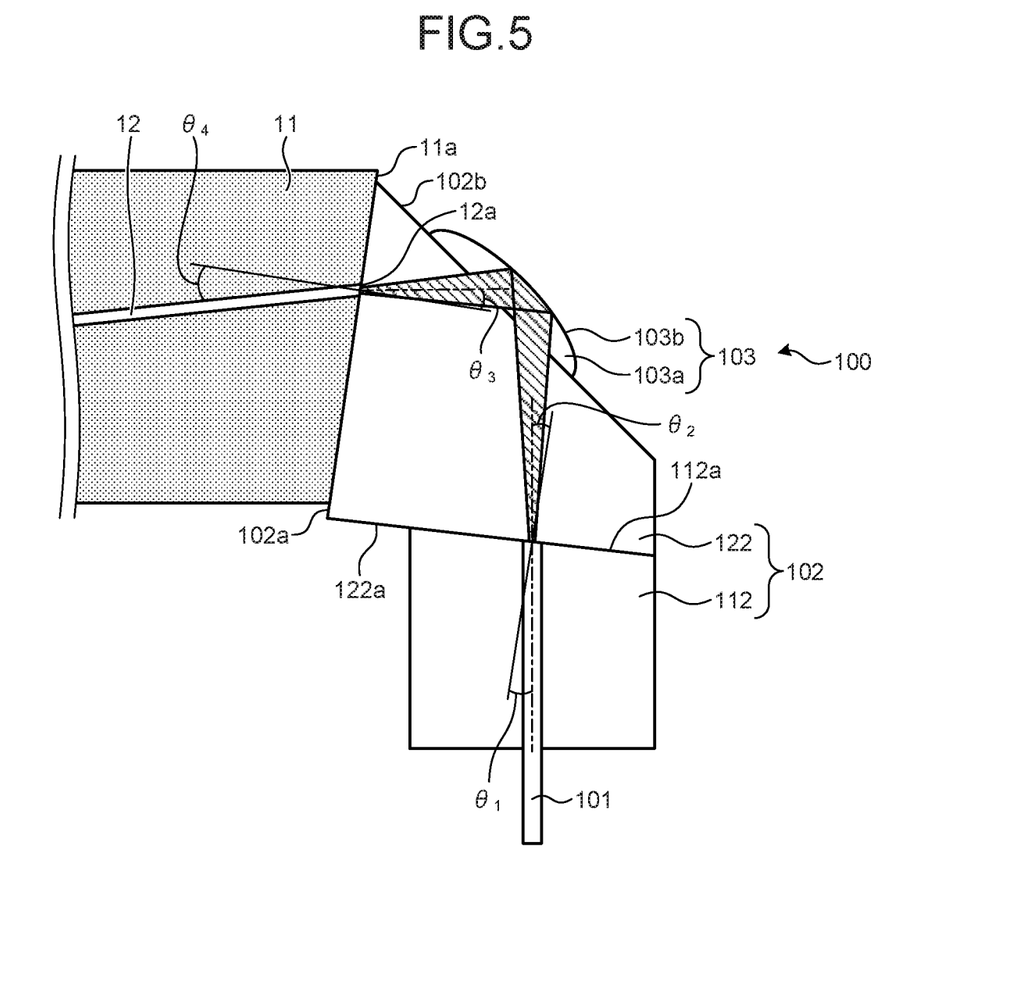
FIG. 5 is an enlarged top view illustrating an exemplary connection between an optical fiber assembly and an optical waveguide according to a second variation.

FIG. 5 is an enlarged top view illustrating an exemplary connection between the optical fiber assembly and the optical waveguide according to the second variation. In the optical fiber assembly 100 illustrated in FIG. 5, the separation surface 112a of the first ferrule 112 and the separation surface 122a of the second ferrule 122 are inclined so as not to be orthogonal to an optical axis of the optical fiber 101. The end surface 11a of the substrate 11 at the end 12a of the optical waveguide 12 and the joint surface 102a of the second ferrule 122 are also inclined so as not to be orthogonal to an optical axis of the optical waveguide 12.

In this case, an angle between the optical axis of the optical fiber 101 and a normal line of the separation surface 112a, and an incident angle of the light that enters the second ferrule 122 through the separation surface 122a are selected such that Snell's law is satisfied. Specifically, the angle between the optical axis of the optical fiber 101 and the normal line of the separation surface 112a is assumed to be $\theta_1$, and the incident angle of the light that enters the second ferrule 122 through the separation surface 122a is assumed to be $\theta_2$. A refractive index of the optical fiber 101 is assumed to be $n_1$, and a refractive index of the second ferrule 122 is assumed to be $n_2$. In this case, $\theta_1$ and $\theta_2$ are selected such that the following expression (1) is satisfied.

$$n_1 \cdot \sin \theta_1 = n_2 \cdot \sin \theta_2 \quad (1)$$

In addition, an incident angle of the light that enters the optical waveguide 12 through the joint surface 102a, and an angle between the optical axis of the optical waveguide 12 and a normal line of the end surface 11a of the substrate 11 are selected such that the Snell's law is satisfied. Specifically, the incident angle of the light that enters the optical waveguide 12 through the joint surface 102a is assumed to be $\theta_3$, and the angle between the optical axis of the optical waveguide 12 and the normal line of the end surface 11a of the substrate 11 is assumed to be $\theta_4$. The refractive index of the second ferrule 122 is assumed to be $n_2$, and a refractive index of the optical waveguide 12 is assumed to be $n_3$. In this case, $\theta_3$ and $\theta_4$ are selected such that the following expression (2) is satisfied.

$$n_2 \cdot \sin \theta_3 = n_3 \cdot \sin \theta_4 \quad (2)$$

As mentioned above, in the optical module 10 according to the second variation, the separation surfaces 112a, 122a and the joint surface 102a of the ferrule 102 are inclined. Therefore, entering of the light reflected at the separation surfaces 112a, 122a and the joint surface 102a of the ferrule 102 into the optical fiber 101 is avoided. As a result, attenuation of the light due to the reflection at the connection between the optical waveguide 12 and the optical fiber 101 extending in the different directions can be suppressed.

Third Variation

Next, a third variation will be described. An optical module according to the third variation has the same configuration as the optical module 10 according to the above-mentioned second variation except that the end surface 11a of the substrate 11 is joined to the joint surface 102a of the ferrule 102 via a cushion member. In the third variation, therefore, components which are common to the above-mentioned second variation are denoted by the same reference signs, and detailed explanations of these components are omitted.

The ferrule 102 is formed of, for example, plastic or the like in terms of easiness of molding. Therefore, a coefficient of thermal expansion of the ferrule 102 is greater than a coefficient of thermal expansion of the substrate 11. The joint surface 102a of the ferrule 102 is joined to the end surface 11a of the substrate 11 at the end 12a of the optical waveguide 12. In a case where an ambient temperature is changed, therefore, stress might be generated in the joint surface 102a of the ferrule 102, and the joint surface 102a might be peeled from the end surface 11a of the substrate 11 due to the generated stress.

In this regard, according to the third variation, the end surface 11a of the substrate 11 is joined to the joint surface 102a of the ferrule 102 via the cushion member in order to prevent the joint surface 102a of the ferrule 102 from being peeled from the end surface 11a of the substrate 11.

Figure 6:
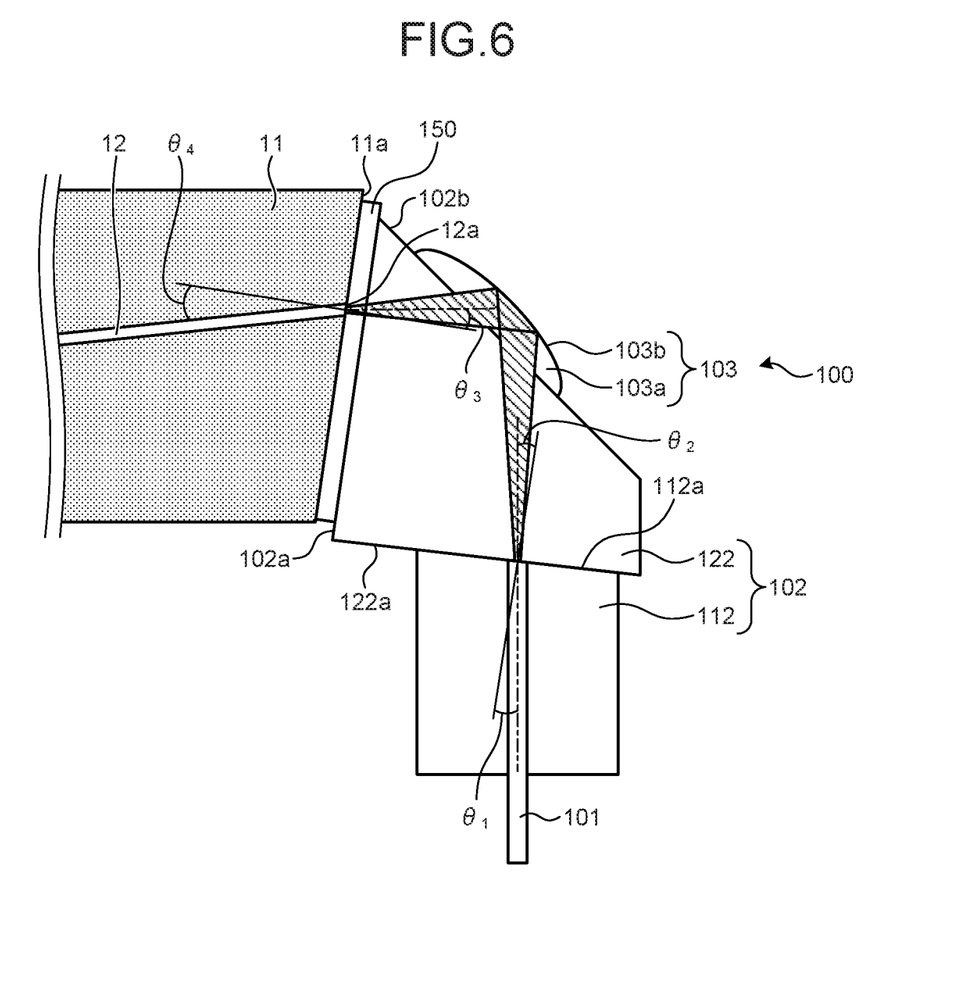
FIG. 6 is an enlarged top view illustrating an exemplary connection between an optical fiber assembly and an optical waveguide according to a third variation.

FIG. 6 is an enlarged top view illustrating an exemplary connection between the optical fiber assembly and the optical waveguide according to the third variation. In the optical fiber assembly 100 illustrated in FIG. 6, the end surface 11a of the substrate 11 at the end 12a of the optical waveguide 12 is joined to the joint surface 102a of the ferrule 102 via a cushion member 150. The cushion member 150 has a coefficient of thermal expansion in a numerical range of the coefficient of thermal expansion of the substrate 11 to the coefficient of thermal expansion of the ferrule 102. For example, the coefficient of thermal expansion of the ferrule 102 is assumed to be greater than the coefficient of thermal expansion of the substrate 11. In this case, the coefficient of thermal expansion of the cushion member 150 is selected from a numerical range greater than the coefficient of thermal expansion of the substrate 11 and less than the coefficient of thermal expansion of the ferrule 102. As a result, the stress due to the difference in the coefficient of thermal expansion is reduced, and the peeling of the joint surface 102a of the ferrule 102 is suppressed.

The above-mentioned explanation has referred to the case where, by using the total reflection at the curved surface 103b, the mirror portion 103 reflects the light in the direction toward the end 12a of the optical waveguide 12, and collects the reflected light into the end 12a of the optical waveguide 12 through the joint surface 102a. However, the curved surface 103b may be processed into a mirror surface. In this case, by using specular reflection at the curved surface 103b, the mirror portion 103 reflects the light in the direction toward the end 12a of the optical waveguide 12, and collects the reflected light into the end 12a of the optical waveguide 12 through the joint surface 102a.

In the above-mentioned explanation, individual configurations and operations of the respective example and variations have been described. However, the optical module 10 of the above-mentioned example and the optical module 10 according to each variation may also be provided with the other components characteristic of the other variations. In addition, any form of combination of the example and variations can be employed. In other words, not only two but also three or more of the example and variations can be combined. For example, in the optical module 10 according to the example, the end surface 11a of the substrate 11 at the end 12a of the optical waveguide 12 may be joined to the joint surface 102a of the ferrule 102 via the cushion member 150. Furthermore, the single optical module may be provided with all the components described in the above-mentioned example and first to third variations as long as the components are compatible with one another.

According to an aspect of an optical module disclosed in the present application, such an effect is obtained that an optical waveguide and an optical fiber extending in different directions can be easily coupled to each other, and a device can be miniaturized.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical module comprising:
   a substrate on which an optical waveguide forming a Mach-Zehnder interferometer is formed; and
   an optical fiber assembly including:
     an optical fiber;
     a translucent member including a joint surface joined to an end surface of the substrate at an end of the optical waveguide, the translucent member being attached to a distal end of the optical fiber and being directly jointed to a core of the optical waveguide; and
     a mirror portion that reflects light emitted from the distal end of the optical fiber in a direction different from a traveling direction of the light, and collects the reflected light into the end of the optical waveguide through the joint surface, the mirror portion being formed on the translucent member.

2. The optical module according to claim 1, wherein
   the direction different from the traveling direction of the light is a direction toward the end of the optical waveguide.

3. The optical module according to claim 1, wherein
   the translucent member further includes an inclined surface inclined relative to the traveling direction of the light emitted from the distal end of the optical fiber,
   the mirror portion includes a projection formed on the inclined surface and formed of a material that is the same as a material of the translucent member, and a curved surface formed on the projection, and
   by using total reflection at the curved surface, the mirror portion reflects the light emitted from the distal end of the optical fiber in the direction different from the traveling direction of the light, and collects the reflected light into the end of the optical waveguide through the joint surface.

4. The optical module according to claim 1, wherein
   the translucent member further includes an inclined surface inclined relative to the traveling direction of the light emitted from the distal end of the optical fiber,
   the mirror portion includes a projection formed on the inclined surface and formed of a material that is the same as a material of the translucent member, and a curved surface formed on the projection and processed into a mirror surface, and
   by using specular reflection at the curved surface, the mirror portion reflects the light from the distal end of the optical fiber in the direction different from the traveling direction of the light, and collects the reflected light into the end of the optical waveguide through the joint surface.

5. The optical module according to claim 1, wherein
   the mirror portion collects the reflected light into the end of the optical waveguide through the joint surface such that the reflected light approximates or matches a mode field diameter of the optical waveguide at the joint surface.

6. The optical module according to claim 1, wherein
   the translucent member is formed so as to be separable into a first translucent member attached to the distal end of the optical fiber and a second translucent member including the joint surface, the mirror portion being formed on the second translucent member, and
   when a position of the first translucent member with respect to a position of the second translucent member is adjusted to a predetermined position with a separation surface of the first translucent member being in contact with a separation surface of the second translucent member, the mirror portion collects the reflected light into the end of the optical waveguide through the joint surface.

7. The optical module according to claim 6, wherein
   the separation surface of the first translucent member and the separation surface of the second translucent member are inclined so as not to be orthogonal to an optical axis of the optical fiber.

8. The optical module according to claim 6, wherein
   the end surface of the substrate at the end of the optical waveguide and the joint surface of the second translucent member are inclined so as not to be orthogonal to an optical axis of the optical waveguide.

9. The optical module according to claim 1, wherein
   the end surface of the substrate at the end of the optical waveguide is joined to the joint surface of the translucent member via a cushion member, and
   the cushion member has a coefficient of thermal expansion in a numerical range of a coefficient of thermal expansion of the substrate to a coefficient of thermal expansion of the translucent member.

10. An optical fiber assembly comprising:
    an optical fiber;
    a translucent member including a joint surface joined to an end surface of a substrate at an end of an optical waveguide forming a Mach-Zehnder interferometer, the translucent member being attached to a distal end of the optical fiber and being directly jointed to a core of the optical waveguide; and
    a mirror portion that reflects light emitted from the distal end of the optical fiber in a direction different from a traveling direction of the light, and collects the reflected light into the end of the optical waveguide through the joint surface, the mirror portion being formed on the translucent member.

11. The optical fiber assembly according to claim 10, wherein
    the direction different from the traveling direction of the light is a direction toward the end of the optical waveguide.

12. The optical fiber assembly according to claim 10, wherein
    the translucent member further includes an inclined surface inclined relative to the traveling direction of the light emitted from the distal end of the optical fiber,
    the mirror portion includes a projection formed on the inclined surface and formed of a material that is the same as a material of the translucent member, and a curved surface formed on the projection, and by using total reflection at the curved surface, the mirror portion reflects the light emitted from the distal end of the optical fiber in the direction different from the traveling direction of the light, and collects the reflected light into the end of the optical waveguide through the joint surface.

13. The optical fiber assembly according to claim 10, wherein the translucent member further includes an inclined surface inclined relative to the traveling direction of the light emitted from the distal end of the optical fiber, the mirror portion includes a projection formed on the inclined surface and formed of a material that is the same as a material of the translucent member, and a curved surface formed on the projection and processed into a mirror surface, and by using specular reflection at the curved surface, the mirror portion reflects the light from the distal end of the optical fiber in the direction different from the traveling direction of the light, and collects the reflected light into the end of the optical waveguide through the joint surface.

14. The optical fiber assembly according to claim 10, wherein the mirror portion collects the reflected light into the end of the optical waveguide through the joint surface such that the reflected light approximates or matches a mode field diameter of the optical waveguide at the joint surface.

15. The optical fiber assembly according to claim 10, wherein the translucent member is formed so as to be separable into a first translucent member attached to the distal end of the optical fiber and a second translucent member including the joint surface, the mirror portion being formed on the second translucent member, and when a position of the first translucent member with respect to a position of the second translucent member is adjusted to a predetermined position with a separation surface of the first translucent member being in contact with a separation surface of the second translucent member, the mirror portion collects the reflected light into the end of the optical waveguide through the joint surface.

16. The optical fiber assembly according to claim 15, wherein the separation surface of the first translucent member and the separation surface of the second translucent member are inclined so as not to be orthogonal to an optical axis of the optical fiber.

17. The optical fiber assembly according to claim 15, wherein the end surface of the substrate at the end of the optical waveguide and the joint surface of the second translucent member are inclined so as not to be orthogonal to an optical axis of the optical waveguide.

18. The optical fiber assembly according to claim 10, wherein the end surface of the substrate at the end of the optical waveguide is joined to the joint surface of the translucent member via a cushion member, and the cushion member has a coefficient of thermal expansion in a numerical range of a coefficient of thermal expansion of the substrate to a coefficient of thermal expansion of the translucent member.

* * * * *